United States Patent
Tian et al.

(10) Patent No.: US 12,487,257 B2
(45) Date of Patent: Dec. 2, 2025

(54) FLUXGATE CURRENT SENSOR AND CURRENT MEASUREMENT METHOD

(71) Applicant: Shenzhen Hangzhi Precision Electronics Co., Ltd., Shenzhen (CN)

(72) Inventors: Xinliang Tian, Shenzhen (CN); Zhouyang Wan, Shenzhen (CN); Yongliang Ding, Shenzhen (CN); Baichi Yao, Shenzhen (CN); Liang Liu, Shenzhen (CN); Chuncai Ye, Shenzhen (CN); Wei Fu, Shenzhen (CN)

(73) Assignee: Shenzhen Hangzhi Precision Electronics Co., Ltd., Shenzhen (CN)

( * ) Notice: Subject to any disclaimer, the term of this patent is extended or adjusted under 35 U.S.C. 154(b) by 237 days.

(21) Appl. No.: 18/210,209

(22) Filed: Jun. 15, 2023

(65) Prior Publication Data

US 2023/0408559 A1    Dec. 21, 2023

(51) Int. Cl.
*G01R 33/04*    (2006.01)
*G01R 19/25*    (2006.01)

(52) U.S. Cl.
CPC .......... *G01R 19/2509* (2013.01); *G01R 33/04* (2013.01)

(58) Field of Classification Search
CPC .... G01R 33/26; G01R 33/04; G01R 19/2509; G01R 33/24; G01R 33/032; G01V 3/14; G01N 24/006
See application file for complete search history.

(56) References Cited

U.S. PATENT DOCUMENTS

| | | | | |
|---|---|---|---|---|
| 4,851,763 A | * | 7/1989 | Grutzmacher | ....... G01R 15/207 324/130 |
| 6,448,767 B1 | * | 9/2002 | Ganther, Jr. | ....... G01R 33/0356 327/527 |

FOREIGN PATENT DOCUMENTS

WO    WO-2021114513 A1 *  6/2021  ............. G01R 19/25

* cited by examiner

*Primary Examiner* — Lee E Rodak
*Assistant Examiner* — Taqi R Nasir
(74) *Attorney, Agent, or Firm* — MUNCY, GEISSLER, OLDS & LOWE, P.C.

(57) ABSTRACT

A fluxgate current sensor and a current measurement method, wherein the fluxgate current sensor includes a magnetic probe and an excitation and detection circuit, and the magnetic probe includes an excitation iron core and an excitation coil, the excitation coil is connected to the excitation and detection circuit, the excitation and detection circuit is used to output alternating excitation voltages to the excitation coil, and the excitation coil is excited to generate alternating excitation currents and cause the excitation iron core to reach saturation alternately; the excitation and detection circuit is further configured to convert the excitation currents flowing through the excitation coil, into equivalent differences of two currents, so as to calculate average values of the excitation currents flowing through the excitation coil via differential equivalent currents, thereby calculating to-be-measured primary currents by the average values of the excitation currents.

6 Claims, 8 Drawing Sheets

FLUXGATE CURRENT SENSOR AND CURRENT MEASUREMENT METHOD

TECHNICAL FIELD

The present invention belongs to the technical field of current detection, in particular to a fluxgate current sensor and a current measurement method.

BACKGROUND TECHNOLOGY

State of charge (SOC) is a key measurement function in electric vehicles (EV) and hybrid electric vehicles (HEV). When electric vehicles run, batteries discharge to supply power, and when electric vehicles brake or are charged to save and store energy in the batteries. However, battery voltages cannot reflect SOC in these transients well, namely amounts of electric charge delivered while charging and discharging, which calls for accurate current measurement technology to realize accurate monitoring of batteries. In addition, in order to ensure safe use of batteries, batteries of EV and HEV are generally not fully discharged or fully charged. If automakers need margins for the accuracy of energy measurements, it is necessary to continually increase safety margins. The advent of high-precision current sensors allows automotive designers to fully trust SOC estimates, thereby reducing size and weight of automotive battery packs. Nevertheless, there are still some difficulties in monitoring currents during charging and discharging, for example, the measurement accuracy is high, temperature drift and zero drift of current sensors are small, and current measurement range is large.

At present, since Hall current sensors mainly adopted by electric vehicles need to disconnect magnetic cores to install Hall cores, sensitivity and resolution thereof are reduced, detection accuracy thereof is not high enough, and zero drift and temperature drift thereof are relatively large, it is difficult to meet the demand of high-precision current detection of electric vehicle battery packs. Current sensors using fluxgate technology are featured in high precision, small temperature drift and zero drift, but conventional fluxgate current sensors with single excited iron core suitable for battery monitoring have limited ranges of current measurement, so it is difficult to accurately measure both large currents and small currents. However, while monitoring currents in charging and discharging, it is usually required that the fluxgate current sensor can accurately measure currents from a few milliamps to hundreds of amps or even thousands of amPs, which requires current sensors to accurately measure large currents and achieve improved identification and measurement accuracy of the small current.

In addition, in order to protect personal safety and equipment safety in electric vehicles, charging piles, power grids and other fields, it is necessary to accurately detect tiny milliampere-level DC residual currents. Existing leakage current sensors also have problems of poor current identification and measurement precision.

SUMMARY OF THE INVENTION

The present invention aims at technical problems that the detection accuracy of electric vehicle battery charging and discharging current is not high enough and the high current and low current cannot be accurately measured at the same time.

The present invention discloses a fluxgate current sensor, comprising a magnetic probe and an excitation and detection circuit, wherein the magnetic probe comprises an excitation iron core and an excitation coil, the excitation coil is connected to the excitation and detection circuit;

the excitation and detection circuit is used to output alternating excitation voltages $v_e$ to the excitation coil, and the excitation coil is excited to generate alternating excitation currents $i_e$ and cause the excitation iron core to reach saturation alternately; and the excitation and detection circuit is further configured to convert the excitation currents $i_e$ flowing through the excitation coil, into equivalent differences of two currents, $i_{e1}$ and $i_{e2}$, so as to calculate average values of the excitation currents flowing through the excitation coil via differential equivalent currents $i_{e1}-i_{e2}$, thereby calculating to-be-measured primary currents $i_d$ by the average values of the excitation currents, and the differential equivalent currents $i_{e1}-i_{e2}$ are configured to eliminate zero drift of the fluxgate current sensor.

Preferably, the excitation iron core comprises an annular closed and saturable soft magnetic core of high magnetic permeability, the excitation iron core is used to carry magnetic flux generated by the to-be-measured primary currents $I_d$ and magnetic flux generated by the excitation currents flowing through the excitation coil, the excitation coil is wound on the excitation iron core, and the excitation coil is used to carry the alternating excitation voltages and the alternating excitation currents constructed by the excitation and detection circuit.

Preferably, the excitation and detection circuit comprises a DC voltage source Vdc, an H-bridge circuit and differential measuring resistors, and the differential measuring resistors comprise a Re1 and a Re2;

the DC voltage source Vdc supplies power for the H-bridge circuit, the H-bridge circuit comprises four switching devices, the switching devices include MOS tubes, and inside the MOS tubes are provided freewheeling diodes;

an upper bridge arm of the H-bridge circuit comprises PNP-type MOS tubes Q1 and Q2, an lower bridge arm of the H-bridge comprises NPN-type MOS tubes Q3 and Q4, an output terminal of the Q4 in the lower bridge arm is connected to a positive end of the differential measuring resistor Re1, an output terminal of the Q3 in the lower bridge arm is connected to a positive end of the Re2, and negative ends of both the Re1 and the Re2 are connected to a potential reference point of the fluxgate current sensor.

Preferably, the alternating excitation voltages $v_e$ are output from the excitation and detection circuit to the excitation coil and a construction method of the alternating excitation voltages $v_e$ is as follows:

controlling the four switching devices in the H-bridge circuit to be turned on in pairs alternately, when the switching devices Q1 and Q4 are turned on, the switching devices Q2 and Q3 are turned off, and when the switching devices Q1 and Q4 are turned off, the switching devices Q2 and Q3 are turned on, thereby constructing excitation voltages $v_e$ alternating between positive and negative values at both ends of the excitation coil to excite the excitation coil.

Preferably, a method for controlling the four switching devices in the H-bridge circuit to be turned on alternately in pairs is as follows:

through magnetic performance parameters and dimensions of the excitation iron core calculated, a current threshold $I_m$ for fully saturating the excitation iron core is obtained, wherein the current threshold $I_m$ meets following conditions when the fluxgate current sensor is designed:

$$I_m > |I_d/N_e|,$$

wherein $I_d$ refers to a to-be-measured primary current, and $N_e$ refers to number of turns of the excitation coil Le; and
when a positive current value flowing through the Re1 reaches the current threshold $I_m$, the switching devices Q1 and Q4 are turned off, the switching devices Q2 and Q3 are turned on, and when a positive current value flowing through the Re2 reaches the current threshold $I_m$, the switching devices Q2 and Q3 are turned off, and the switching devices Q1 and Q4 are turned on, so as to alternately control the four switching devices in the H-bridge circuit to be turned on in pairs through a peak value of the positive currents flowing through the Re1 and the Re2.

Preferably, the differential equivalent currents $i_{e1}-i_{e2}$ are constructed as follows:
the four switching devices in the H-bridge circuit are turned on in pairs, and when a switching device on the upper bridge arm of the H-bridge circuit and a switching device on the lower bridge arm of the H-bridge circuit are turned on simultaneously, the excitation currents $i_e$ flowing through the excitation coil flow through Re1 and Re2 to form current loops; and
when the switching devices Q1 and Q4 are turned on, the excitation currents $i_e$ flow through the Re1, and at this time, the excitation currents $i_e$ are defined to flow in a same direction as a current direction in the Re1, and when the switching devices Q2 and Q3 are turned on, the excitation currents $i_e$ are defined to flow in an opposite direction to a current direction in the Re2, so the excitation currents $i_e$ is equal to the differential equivalent currents $i_{e1}-i_{e2}$, i.e., $i_e=i_{e1}-i_{e2}$.

Preferably, the fluxgate current sensor further comprises an operational amplifier, an ADC analog-to-digital converter, and a microprocessor MCU, wherein
in a process of obtaining the average values of the excitation currents $i_{av}$ through the differential equivalent currents $i_{e1}-i_{e2}$, and the operational amplifier makes gain adjustment, so as to output generated digital signals, the ADC analog-to-digital converter is configured for sampling, and microprocessor MCU executes operation.

The present invention provides a current measurement method applied to the fluxgate current sensor, comprising following steps of:
S1—designing a fluxgate current sensor, wherein the fluxgate current sensor comprises a magnetic probe and an excitation and detection circuit, the magnetic probe comprises an excitation iron core and an excitation coil, the excitation coil is wound on the excitation iron core, and the excitation coil is connected to the excitation and detection circuit;
S2—controlling the excitation and detection circuit to output alternating excitation voltages to both ends of the excitation coil, so that alternating excitation currents are excited to flow in the excitation coil and cause the excitation iron core to reach saturation alternately;
S3—conducting difference calculation between currents $i_{e1}$ and $i_{e2}$ flowing through Re1 and Re2, i.e., $i_{e1}-i_{e2}$, to obtain a current value equivalent to the excitation currents $i_e$;
S4—calculating average values $i_{av}$ of the excitation current on the excitation coil; and
S5—calculating a to-be-measured primary DC current $I_d$.

The present invention provides an electronic device comprising a memory and a processor, wherein the processor is used to implement the steps of the current measurement method when a computer management program stored in the memory is executed.

The present invention provides a computer-readable storage medium, comprising a computer management program stored thereon, wherein when the computer management program is executed by a processor, the steps of the current measurement method are realized.

The present invention has following beneficial effects:
The present invention provides a fluxgate current sensor and a current measurement method, wherein the fluxgate current sensor comprises a magnetic probe and an excitation and detection circuit, and the magnetic probe comprises an excitation iron core and an excitation coil, the excitation coil is connected to the excitation and detection circuit, the excitation and detection circuit is used to output alternating excitation voltages $v_e$ to the excitation coil, and the excitation coil is excited to generate alternating excitation currents and cause the excitation iron core to reach saturation alternately; the excitation and detection circuit is further configured to convert the excitation currents $i_e$ flowing through the excitation coil into equivalent differences of two currents $i_{e1}$ and $i_{e2}$, so as to calculate average values of the excitation currents flowing through the excitation coil via differential equivalent currents $i_{e1}-i_{e2}$, thereby calculating to-be-measured primary currents $I_d$ by the average values of the excitation currents. The differential equivalent currents $i_{e1}-i_{e2}$ are configured to calculate average values of the excitation currents so as to eliminate errors caused by zero drift, thereby eliminating errors caused by zero drift to the fluxgate current sensor when to-be-measured primary currents are measured, and improving current measurement accuracy.

The markups in the present invention are indicated as follows:
100: fluxgate based automotive current sensor;
1: magnetic probe;

2: excitation and detection circuit;
$I_d$: to-be-measured primary direct current;
Vdc: DC voltage source;
Re1: differential measuring resistor 1;
Re2: differential measuring resistor 2;
$v_e$: excitation voltage;
$i_e$: excitation current; Le: excitation coil;
Te: excitation iron core;
$I_m$: maximum excitation current threshold;
$N_e$: number of turns of the excitation coil $L_e$;
Q1~Q4: four switching devices of H-bridge circuit;
$i_{e1}$: current flowing through differential measuring resistor 1;
$i_{e2}$: current flowing through differential measuring resistor 2;
$i_{av}$: average value of the excitation current; and
$\Delta I_e$: constant value of excitation current converted from zero drift.

Specific Embodiments

The specific embodiments of the present invention will be further described in detail below in conjunction with the accompanying drawings and embodiments. The following embodiments are used to illustrate the present invention, but are not intended to limit protection scope of the present invention.

The present invention discloses a fluxgate current sensor, comprising a magnetic probe and an excitation and detection circuit, wherein the magnetic probe comprises an excitation iron core and an excitation coil, the excitation coil is connected to the excitation and detection circuit; the excitation and detection circuit is used to output alternating excitation voltages $v_e$ to the excitation coil, and the excitation coil is excited to generate alternating excitation currents $i_e$ and cause the excitation iron core to reach saturation alternately; the excitation and detection circuit is further configured to convert the excitation currents $i_e$ flowing through the excitation coil, into equivalent differences of two currents, $i_{e1}$ and $i_{e2}$, so as to calculate average values of the excitation currents flowing through the excitation coil via differential equivalent currents $i_{e1}-i_{e2}$, thereby calculating to-be-measured primary currents $I_d$ by the average values of the excitation currents, and the differential equivalent currents $i_{e1}-i_{e2}$ are configured to eliminate zero drift of the fluxgate current sensor. Average values of the excitation currents are measured to achieve indirect measurement of to-be-measured primary currents, and the differential equivalent currents $i_{e1}-i_{e2}$ are used to calculate average values of the excitation currents so as to eliminate errors caused by zero drift, thereby eliminating errors caused by zero drift to the fluxgate current sensor when to-be-measured primary currents are measured, and improving current measurement accuracy.

Figure 1:
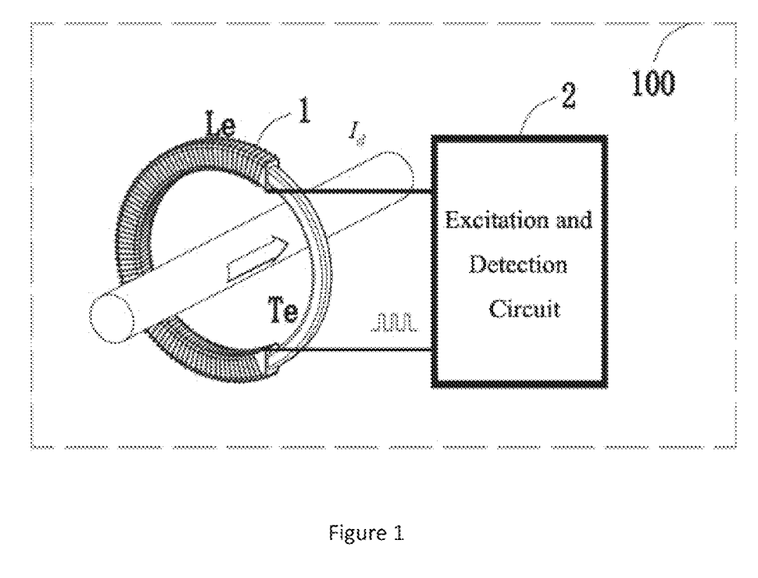
FIG. 1 shows composition structure of a fluxgate current sensor of the present invention.
Figure 2:
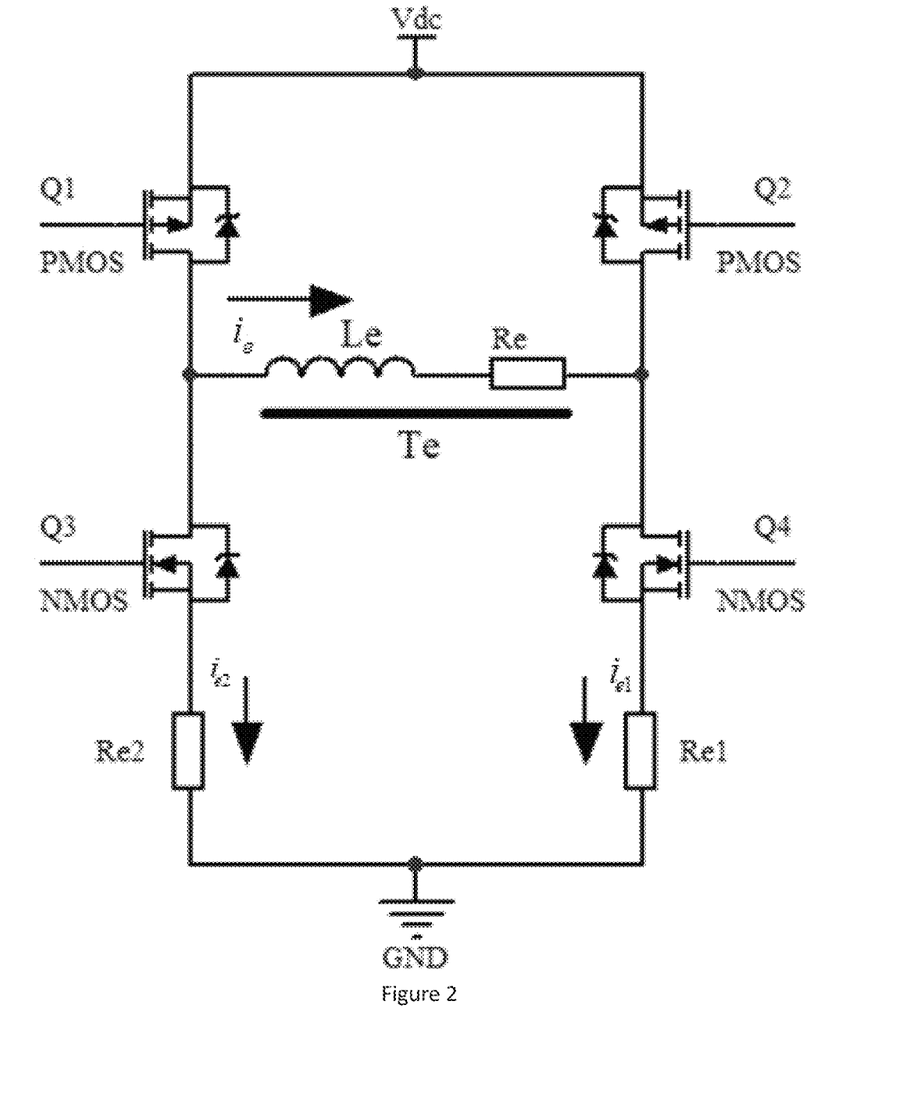
FIG. 2 is a circuit diagram of an excitation and detection circuit of the fluxgate current sensor of the present invention.

Specifically, as shown in FIG. 1, the present invention discloses a fluxgate-based automotive-grade current sensor 100 (i.e., a fluxgate current sensor), the fluxgate current sensor is used for measuring to-be-measured primary currents $I_d$, comprising a magnetic probe 1 and an excitation and detection circuit 2, wherein the magnetic probe 1 comprises an excitation iron core and an excitation coil, the excitation coil is used to carry alternating excitation voltages and alternating excitation currents constructed by the excitation and detection circuit, the magnetic probe is connected to the excitation and detection circuit; the excitation and detection circuit comprises a DC voltage source Vdc, an H-bridge circuit and differential measuring resistors, and the differential measuring resistors comprise a Re1 and a Re2; the excitation and detection circuit is used to output alternating excitation voltages $v_e$ to the excitation coil, and the excitation coil is excited to generate alternating excitation currents $i_e$ and cause the excitation iron core to reach saturation alternately; further, the excitation and detection circuit is configured to convert the excitation currents $i_e$ flowing through the excitation coil, into equivalent differences of two currents, $i_{e1}$ and $i_{e2}$, wherein $i_{e1}$ refers to currents flowing through the differential measuring resistor Re1, and $i_{e2}$ refers to currents flowing through differential measuring resistor Re2, so as to calculate average values of the excitation currents flowing through the excitation coil via differential equivalent currents $i_{e1}-i_{e2}$, thereby calculating to-be-measured primary currents $I_d$ by the average values of the excitation currents, and the differential equivalent currents $i_{e1}-i_{e2}$ are configured to eliminate zero drift of the fluxgate current sensor.

four switching devices in the H-bridge circuit are controlled to be turned on in pairs alternately, when the switching devices Q1 and Q4 are turned on, the switching devices Q2 and Q3 are turned off; and when the switching devices Q1 and Q4 are turned off, the switching devices Q2 and Q3 are turned on, thereby constructing excitation voltages $v_e$ alternating between positive and negative values at both ends of the excitation coil to excite the excitation coil Preferably, a method for controlling the four switching devices in the H-bridge circuit to be turned on alternately in pairs is as follows:
through magnetic performance parameters and dimensions of the excitation iron core calculated, a current threshold $I_m$ for fully saturating the excitation iron core is obtained, wherein the current threshold $I_m$ meets following conditions when the fluxgate current sensor is designed:

$$I_m > |I_d/N_e|,$$

wherein $I_d$ refers to a to-be-measured primary current, and $N_e$ refers to number of turns of the excitation coil Le; and when a positive current value flowing through the Re1 reaches the current threshold $I_m$, the switching devices Q1 and Q4 are turned off, the switching devices Q2 and Q3 are turned on, and when a positive current value flowing through the Re2 reaches the current threshold $I_m$, the switching devices Q2 and Q3 are turned off, and the switching devices Q1 and Q4 are turned on, so as to alternately control the four switching devices in the H-bridge circuit to be turned on in pairs alternatively through a peak value of the positive currents flowing through the Re1 and the Re2.

The excitation and detection circuit is configured to convert the excitation currents $i_e$ flowing through the excitation coil, into equivalent differences of two currents, $i_{e1}$ and $i_{e2}$, the differential equivalent currents $i_{e1}-i_{e2}$ are constructed as follows:
the four switching devices in the H-bridge circuit are turned on in pairs, and when a switching device on the upper bridge arm of the H-bridge circuit, which means that a switching device on the lower bridge arm of the H-bridge circuit has to be turned on simultaneously, therefore, there is no situation where two switching devices of the upper bridge arm of the H-bridge circuit or two switching devices of the lower bridge arm of the H-bridge are turned on at the same time; to form current loops means that the excitation currents $i_e$ flowing through the excitation coil have to flow through differential measuring resistors Re1 and Re2, and at any time, the excitation currents $i_e$ only flow through a unique differential measuring resistor Re1 or Re2; when the switching devices Q1 and Q4 are turned on, the excitation currents $i_e$ flow through the Re1, and at this time, the excitation currents $i_e$ are defined to flow in a same direction as a current direction in the Re1, and when the switching devices Q2 and Q3 are turned on, the excitation currents $i_e$ flow through the Re2, the excitation currents $i_e$ flow in an opposite direction to a current direction in the Re2, so the excitation currents $i_e$ are equal to the differential equivalent currents $i_{e1}-i_{e2}$, i.e., $i_e=i_{e1}-i_{e2}$.

When the H-bridge circuit works, excitation voltages and excitation currents in the excitation iron core change as follows. In order to simplify calculation, the derivation process ignores conduction voltage drops of MOS tubes and the freewheeling diodes in the switching devices of the H-bridge circuit.

Figure 3:
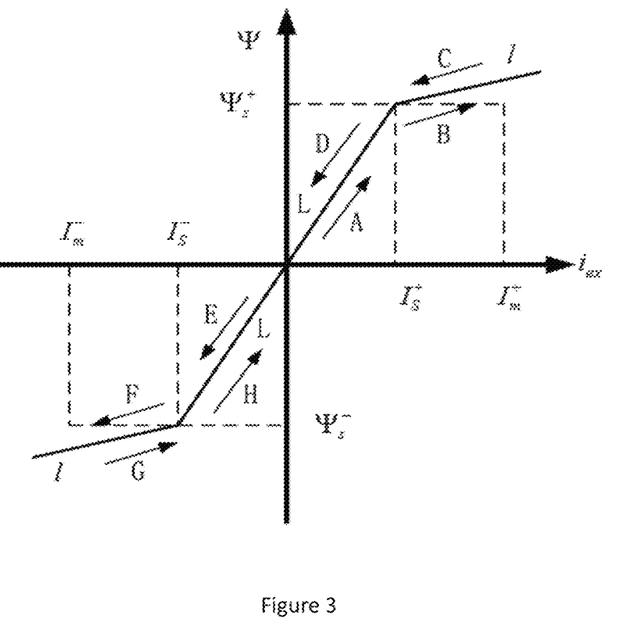
FIG. 3 shows magnetization curve of an excitation iron core Te of the present invention.
Figure 4:
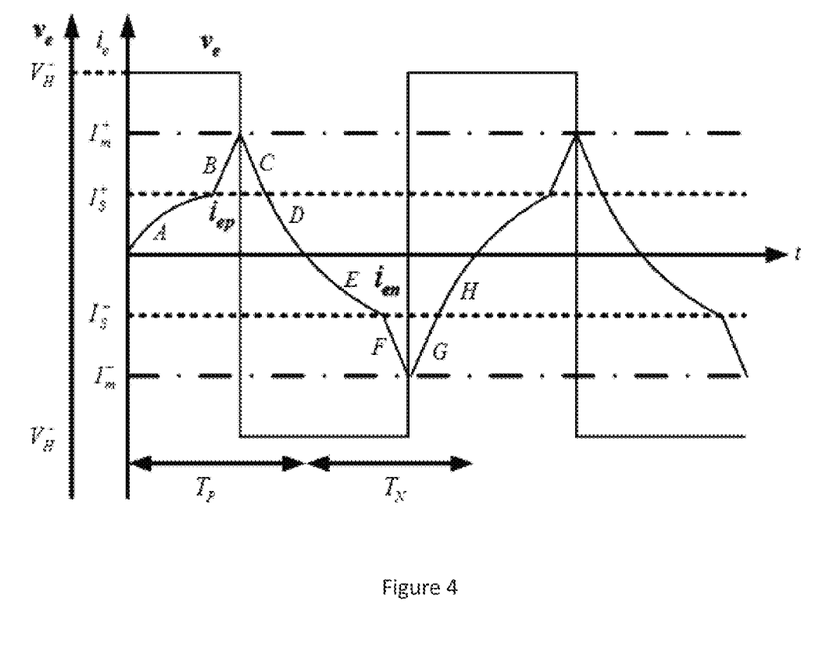
FIG. 4 shows excitation voltage and excitation current waveforms of the present invention.

In a circuit as shown in FIGS. 1~4, when a to-be-measured primary direct current $I_d$ is zero, magnetization curve of an excitation iron core Te of the fluxgate current sensor, an excitation voltage $v_e$ and an excitation currents $i_e$ change as shown in FIGS. 3~4.

As shown in FIG. 3, the magnetization curve of the nonlinear excitation iron core Te is in a form of a three-fold line, L and l respectively represent self-inductance coefficients when the excitation iron core Te works in a linear zone and s saturated zone, $\psi_S^+$ and $\psi_S^-$ respectively represent flux linkage coefficients when the excitation core Te just reaches positive saturation and negative saturation, $I_S^+$ and $I_S^-$ respectively represent positive and negative saturation currents of excitation core Te, $I_m^+$ and $I_m^-$ respectively represent positive and negative maximum excitation currents of excitation core Te, and $V_H^+$ and $V_H^-$ represent positive and negative peak values of excitation voltage ve, respectively. Excitation voltage $v_e$ excites nonlinear excitation iron core Te to generate excitation current $i_e$. When it Is assumed that the circuit parameters are set reasonably, $I_m^+=-I_m^-=I_m$, $I_S^+=-I_S^-=I_S$ $V_H^+=-V_H^-=V_H$, and $I_m>I_S$, so as to ensure that the excitation iron core Te are fully saturated.

As shown in FIG. 4, the H-bridge circuit works in accordance with following four phases:

Phases 1: it is assumed that MOS tubes in the switching devices Q1 and Q4 are turned on when the fluxgate current sensor is powered on, the excitation iron core Te works in a linear zone A, the excitation voltage at both ends of the excitation coil $v_e=V_H^+$, and the excitation current in the excitation coil $i_e=0$; after power-on, the excitation current $i_e$ increases gradually from zero to positive, and the excitation in the nonlinear excitation iron core Te increases gradually, when a positive excitation current increases to $i_e=I_S^+$, the excitation iron core Te reaches positive saturation; thereafter, the excitation iron core Te works from the linear zone A into a forward saturation zone B, a self-inductance coefficient of an excitation winding $W_1$ changes from L to l, excitation impedance decreases, and the excitation current increases rapidly until $i_e=I_m^+$.

Phases 2: at this time, the switching devices Q1 and Q4 are turned off, and since a current in the excitation coil cannot be changed rapidly, positive current thereof flows through the freewheeling diodes in the switching devices Q2 and Q3, and this process can also be regarded as the switching devices Q2 and Q3 are turned on, with a same effect. At this time, the excitation voltage at both ends of the excitation coil is $v_e=V_H^-$, the excitation iron core Te works from the forward saturation zone B into forward continuous flow zones C and D, and the positive excitation current $i_e$ continues to decrease until $i_e=0$, and a diode forward continuous flow process ends.

Phases 3: at this time, the MOS tubes in the switching devices Q2 and Q3 are switched—on, the excitation voltages at both ends of the excitation coil is $v_e=V_H^-$, the excitation iron core Te works from the continuous flow zone D into a negative linear zone E and a negative saturated zone F, and a negative excitation current $i_e$ increases until $i_e=I_m^-$.

Phases 4: at this time, switching devices Q2 and Q3 are turned off, and since the current in the excitation coil cannot be changed rapidly, negative current thereof flows through the freewheeling diodes in switching devices Q1 and Q4, and this process can also be regarded as switching devices Q1 and Q4 are turned on because both effect are same. At this time, the excitation voltage is $v_e=V_H^+$, the excitation iron core Te works from the negative saturation zone F into negative continuous flow zones G and H, and the negative excitation current $i_e$ continues to decrease until $i_e=0$.

At this time, the MOS tubes in the switching device Q1 and Q4 are switched on, and the excitation iron core Te re-enters the linear zone A to work, the excitation iron core Te repeatedly works in zones A to F according to the above working state, and the process from the first phases to the fourth phases is repeated.

The fluxgate current sensor further comprises an operational amplifier, or an ADC analog-to-digital converter, and a microprocessor MCU, which are connected to the excitation and detection circuit, the operational amplifier, or the ADC analog-to-digital converter, and the microprocessor MCU comprises values for calculating the differential equivalent current $i_{e1}-i_{e2}$ and average values of the excitation currents, in a process of obtaining the average values of the excitation currents $i_{av}$ through the differential equivalent currents $i_{e1}-i_{e2}$, and the operational amplifier makes gain adjustment, so as to output generated digital signals, the ADC analog-to-digital converter and microprocessor MCU is configured for sampling, and executing operation.

The differential equivalent currents $i_{e1}-i_{e2}$ are configured to eliminate zero drift of the fluxgate current sensor. The zero point drift is caused by an inherent output zero point of the operational amplifier and ADC analog-to-digital converter every time when the fluxgate current sensor is powered on, and the inherent output zero point changes randomly within a certain range, which becomes nonlinear errors of the current sensor.

A method that the fluxgate current sensor measure to-be-measured primary direct currents $I_d$, namely a current measurement method, comprising following steps of:

S1—designing a fluxgate current sensor, wherein the fluxgate current sensor comprises a magnetic probe and an excitation and detection circuit, the magnetic probe comprises an excitation iron core and an excitation coil, the excitation coil is wound on the excitation iron core, and the excitation coil is connected to the excitation and detection circuit;

S2—controlling the excitation and detection circuit to output alternating excitation voltages to both ends of the excitation coil, so that alternating excitation currents are excited to flow in the excitation coil and cause the excitation iron core to reach saturation alternately;

S3—conducting difference calculation between currents $i_{e1}$ and $i_{e2}$ flowing through differential measuring resistors Re1 and Re2, i.e., $i_{e1}-i_{e2}$, to obtain current values equivalent to the excitation currents $i_e$;

S4—calculating average values of the excitation current on the excitation coil $i_{av}$; and S5—calculating to-be-measured primary DC currents $I_d$.

The average excitation currents in the present invention are obtained for the purpose of using average current models of fluxgate technology. The average current models refer to the approximate linear relationship between average excitation currents of the fluxgate current sensor and to-be-measured primary direct currents. Indirect measurement of to-be-measured primary direct currents can be realized by measuring average excitation currents. The basic principle of the average current models has been discussed in many literatures and will not be elaborated in the present invention.

In the present invention, the differential equivalent currents $i_{e1}-i_{e2}$ are configured to eliminate zero drift of the fluxgate current sensor which has following principles:

1. Influence of zero drift when average excitation currents are directly calculated by excitation currents $i_e$ When the to-be-measured primary direct current $I_d$ is zero, the waveform of the excitation currents 1 of the excitation coil is as shown in FIG. 4, a working period T of excitation currents can be divided into a positive half-cycle TP and a negative half-cycle TN. When it is assumed that the excitation currents $i_e$ at a positive half-cycle TP are positive currents $i_{ep}$, and the excitation currents $i_e$ at a negative half-cycle TN are the negative currents $i_{en}$, then $i_e=i_{ep}+i_{en}$. In an ideal state, the waveform of excitation currents $i_e$ has a shape at the positive half-cycle is symmetrical to a shape at the negative half-cycle, so average values $i_{av}$ or of excitation currents $i_e$ in one period are zero.

However, the operational amplifier and the ADC analog-to-digital converter used in the signal gain adjustment and sampling process will output a varying inherent zero point each time when power is on or external environment changes. When it is assumed that the zero drift generated by output inherent zero point of the operational amplifier and ADC analog-to-digital converter is converted into a excitation current of the excitation coil current equal to a constant $\Delta I_e$, then it can be understood as that each sampled value of each excitation current $i_e$ is equal to each actual value thereof plus the constant $\Delta I_e$, which is equivalent to the curve of the excitation currents in FIG. 4 being translated upward by a distance of the constant $\Delta I_e$.

Therefore, when the zero drift makes actual values of to-be-measured primary direct currents zero, average values $i_{av}$ of excitation currents are not equal to zero, namely, $i_{av}=\Delta I_e$, and calculated values $I_{dd}$ of to-be-measured primary direct currents $I_d$ are also not equal to zero. So the fluxgate current sensor generates a zero drift error, whose values change each time when power is on and distribute randomly within a certain error range, which cannot be calibrated.

It is assumed that a rated range of the fluxgate current sensor is 500 A, as a rule of thumb, errors caused by the above zero drift are about 1/10000 of the rated range of the fluxgate current sensor, namely 50 mA. Therefore, when the fluxgate current sensor adopts the method of obtaining the average excitation currents through the excitation currents $i_e$, the fluxgate current sensor will not be able to measure small currents less than 50 mA, thus affecting identification and measurement accuracy of small currents of the fluxgate current sensor.

2. Influence of zero drift when average excitation currents are calculated by differential equivalent currents $i_{e1}-i_{e2}$ The four switching devices in the H-bridge circuit of the present invention are turned on alternately in pairs, and one switching device on the upper bridge arm of the H-bridge circuit has to be turned on at the same time as one switching device on the lower bridge arm of the H-bridge circuit. Therefore, there is no case that the two switching devices of the upper bridge arm of H-bridge circuit or the two switching devices of the lower bridge arm of H-bridge circuit are switched on at the same time, the excitation currents $i_e$ flowing through the excitation coil have to flow through the differential measuring resistors Re1 and Re2 to form current loops, and at any time, the excitation currents $i_e$ only flow through the only differential measuring resistor Re1 or Re2. When the switching devices Q1 and Q4 are switched on, the excitation currents $i_e$ flow through the differential measuring resistor Re1, and a direction of excitation currents a $i_e$ are defined to be the same as a direction of currents in the differential measuring resistor Re1. When the switching devices Q2 and Q3 are switched on, the excitation currents $i_e$ flow through the differential measuring resistor Re2, and a direction of the excitation currents is opposite to a direction of currents in the differential measuring resistor Re2. Therefore, the excitation currents $i_e$ are equal to differential equivalent currents $i_{e1}-i_{e2}$, namely $i_e=i_{e1}-i_{e2}$ The excitation currents $i_e$ flowing through the excitation coil are equivalent to difference values between two currents $i_{e1}$ and $i_{e2}$ via the differential measuring resistors, Re1 and Re2.

Figure 5:
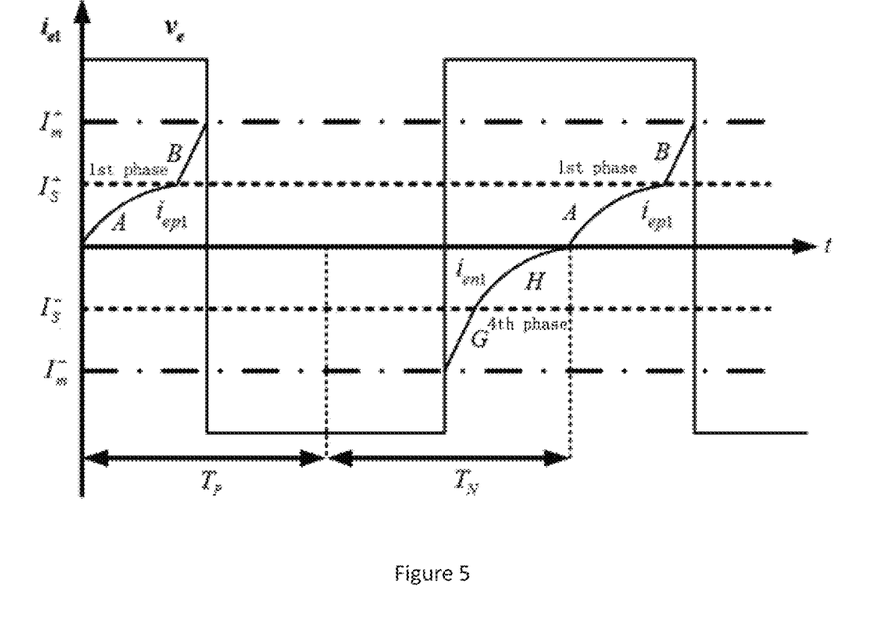
FIG. 5 shows current waveforms flowing on a differential measuring resistor Re1 in one cycle of the present invention.
Figure 6:
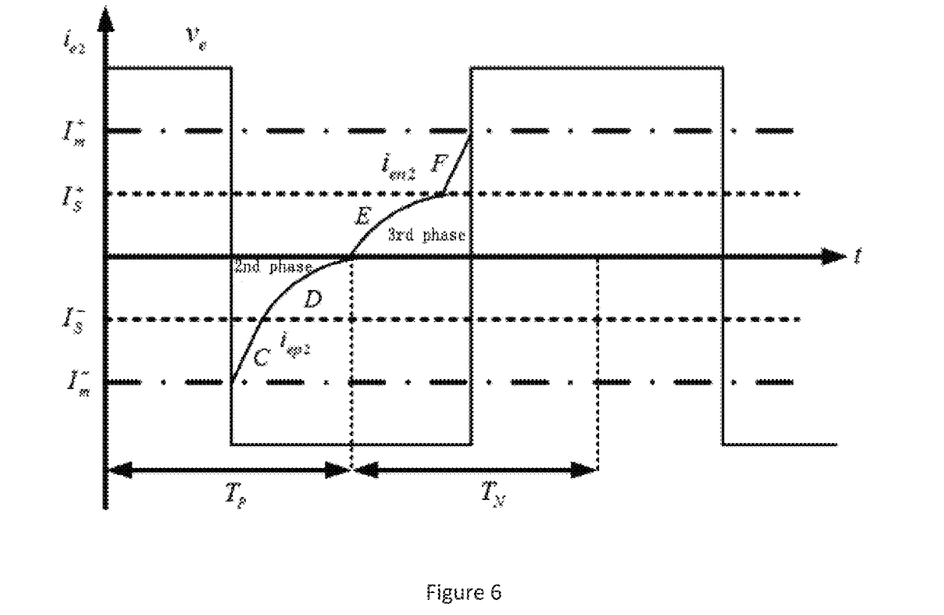
FIG. 6 shows current waveforms flowing on a differential measuring resistor Ret in one cycle of the present invention.

FIG. 5 and FIG. 6 show current waveforms flowing through the differential measuring resistors Re1 and Re2 in one cycle, respectively, and by comparing the excitation current waveform shown in FIG. 4, it can be seen that positive excitation currents $i_{ep}$ are converted into positive currents $i_{ep1}$ in Re1 and negative currents $i_{ep2}$ in Re2 through the differential measuring resistors, and negative excitation currents $i_{en}$ are converted into positive currents $i_{en2}$ in Re2 and negative currents $i_{en1}$ in Re1 through the differential measuring resistors, then following equations are derived:

$$i_{ep}=i_{ep1}-i_{ep2} \quad (1),$$

$$i_{en}=i_{en1}-i_{en2} \quad (2), \text{ and}$$

$$i_e=i_{ep}+i_{en}=i_{ep1}+i_{en1}+-i_{ep2}-i_{en2}=(i_{ep1}+i_{en1})-(i_{ep2}+i_{en2})$$
$$=i_{e1}-i_{e2} \quad (3), \text{ wherein}$$

$i_{ep1}$ and $i_{en1}$ are currents flowing through the differential measuring resistor Re1, while $i_{ep2}$ and $i_{en2}$ are currents flowing through the differential measuring resistors Re2. As can be seen from equation (3), the excitation currents $i_e$ of the excitation coil are equal to differences between currents $i_{e1}-i_{e2}$ flowing through the differential measuring resistors Re1 and Re2.

As can be known from the above description, the present invention uses the differential measuring resistors Re1 and Re2 to convert the positive excitation currents $i_{ep}$ into the positive currents $i_{ep1}$ and the negative currents $i_{ep2}$, and the negative excitation currents $i_{en}$ into positive currents $i_{en2}$ and negative currents $i_{en1}$, which provides necessary conditions for eliminating zero drift of the fluxgate current sensor by calculating average excitation currents through the differential equivalent currents.

When the to-be-measured primary direct currents $I_d$ are zero, it is assumed that the zero drift generated by output inherent zero point of the operational amplifier and ADC analog-to-digital converter is converted into a excitation current of the excitation coil equal to a constant $\Delta I_e$, which is equivalent to that current curves of current $i_{e1}$ and $i_{e2}$ in the differential measuring resistors Re1 and Re2 in FIG. 5 and FIG. 6 are translated upward by a distance of the constant $\Delta I_e$.

However, as positive excitation currents $i_{ep}$ are converted into positive currents $i_{ep1}$ and negative currents $i_{ep2}$, when it is assumed that sampling points on both positive currents $i_{ep1}$ and negative currents $i_{ep2}$ in obtaining a positive average excitation currents $i_{avp}$ in a cycle are constants N, then sampling values on positive) currents $i_{ep1}$ are from $i_{ep11}$ to $i_{ep1N}$, sampling values of negative currents $i_{ep2}$ are from $i_{ep21}$ to $i_{ep2N}$, and following equation (4) can be obtained:

$$i_{avp} = \frac{[(i_{ep11} + \Delta I_e) + (i_{ep12} + \Delta I_e) + \ldots (i_{ep1N} + \Delta I_e)]}{2N} - \frac{[(i_{ep21} + \Delta I_e) + (i_{ep22} + \Delta I_e) + \ldots (i_{ep2N} + \Delta I_e)]}{2N} = \frac{(i_{ep11} + i_{ep12} + \ldots i_{ep1N}) - (i_{ep21} + i_{ep22} + \ldots i_{ep2N})}{2N}. \quad (4)$$

As can be seen from equation (4), when a positive average excitation current $i_{avp}$ in a cycle is calculated, constants $\Delta I_e$ in both the positive currents $i_{ep1}$ and the negative currents $i_{ep2}$ offset with each other in the process of calculating difference values, excitation current errors $\Delta I_e$ caused by the zero drift do not affect calculation of the positive average excitation current $i_{avp}$, and there is no zero drift error.

Similarly, negative excitation currents $i_{en}$ are converted into positive currents $i_{en2}$ and negative currents $i_{en1}$, when it is assumed that sampling points on both positive currents $i_{en2}$ and negative currents $i_{en1}$ in calculating a negative average excitation current $i_{avn}$ in a cycle are constants N, and sampling values of negative currents $i_{en1}$ are from $i_{en11}$ to $i_{en1N}$, and sampling values of the positive currents $i_{en2}$ are $i_{en21}$ to $i_{en2N}$ then equation (5) can be obtained as follows:

$$i_{avn} = \frac{[(i_{en11} + \Delta I_e) + (i_{en12} + \Delta I_e) + \ldots (i_{en1N} + \Delta I_e)]}{2N} - \frac{[(i_{en21} + \Delta I_e) + (i_{en22} + \Delta I_e) + \ldots (i_{en2N} + \Delta I_e)]}{2N} = \frac{(i_{en11} + i_{en12} + \ldots i_{en1N}) - (i_{en21} + i_{en22} + \ldots i_{en2N})}{2N}, \quad (5)$$

As can be seen from equation (5), when a negative excitation average current $i_{avn}$ in a cycle is calculated, constants $\Delta I_e$ in the positive currents $i_{en2}$ and the negative currents $i_{en1}$ offset with each other in the process of calculating difference values, so excitation current errors $\Delta I_e$ brought by the zero drift does not affect calculation of the negative average excitation current $i_{avp}$ and there is no zero drift error.

Though equation (4) and equation (5), the positive average excitation current $i_{avp}$ and negative average excitation current $i_{avn}$ in one cycle are obtained, and an average excitation current $i_{av}$, in one cycle is obtained, i.e., $i_{av} = i_{avp} + i_{avn}$.

Further, according to the average excitation current $i_{av}$, a calculated value $I_{dd}$ of a to-be-measured primary direct current $I_d$ can be obtained, namely $I_{dd} = i_{av} \times N_e$, wherein $N_e$ is number of turns of the excitation coil Le.

When a to-be-measured primary direct current is zero, in an ideal state, a positive average excitation current $i_{avp}$ and a negative average excitation current $i_{avn}$ are equal in numerical value but opposite in direction. Therefore, an average value $i_{av}$ of excitation currents $i_e$ in one cycle is equal to zero, and a calculated value $I_{dd}$ of the to-be-measured primary direct current $I_d$ is also equal to 0.

From the above derivation, it can be seen that errors caused by zero drift can be eliminated by calculating average excitation currents through differential equivalent currents $i_{e1} - i_{e2}$, and then errors caused by zero drift to the to-be-measured primary direct currents of the fluxgate current sensor can be eliminated.

The rated range of the fluxgate current sensor in the present invention is 500 A, and according to actual test results, after calculating average excitation currents through differential equivalent currents $i_{e1} - i_{e2}$, the fluxgate current sensor developed by the present invention is able to detect small currents of 5 mA, has a current resolution of 2 mA, and achieves improved resolution and detection accuracy of small currents, compared with those adopting the method of directly calculating average excitation currents by excitation currents $i_e$. In addition, the technical solutions of the present invention can be applied to leakage current sensors, so as to detect micro-currents which have current levels around 1 mA. Leakage current sensor developed by the present invention can detect a micro-current of 1 mA, and the small current recognition degree and measurement accuracy of the leakage current sensor are improved through the technical solutions of the present invention.

Figure 7:
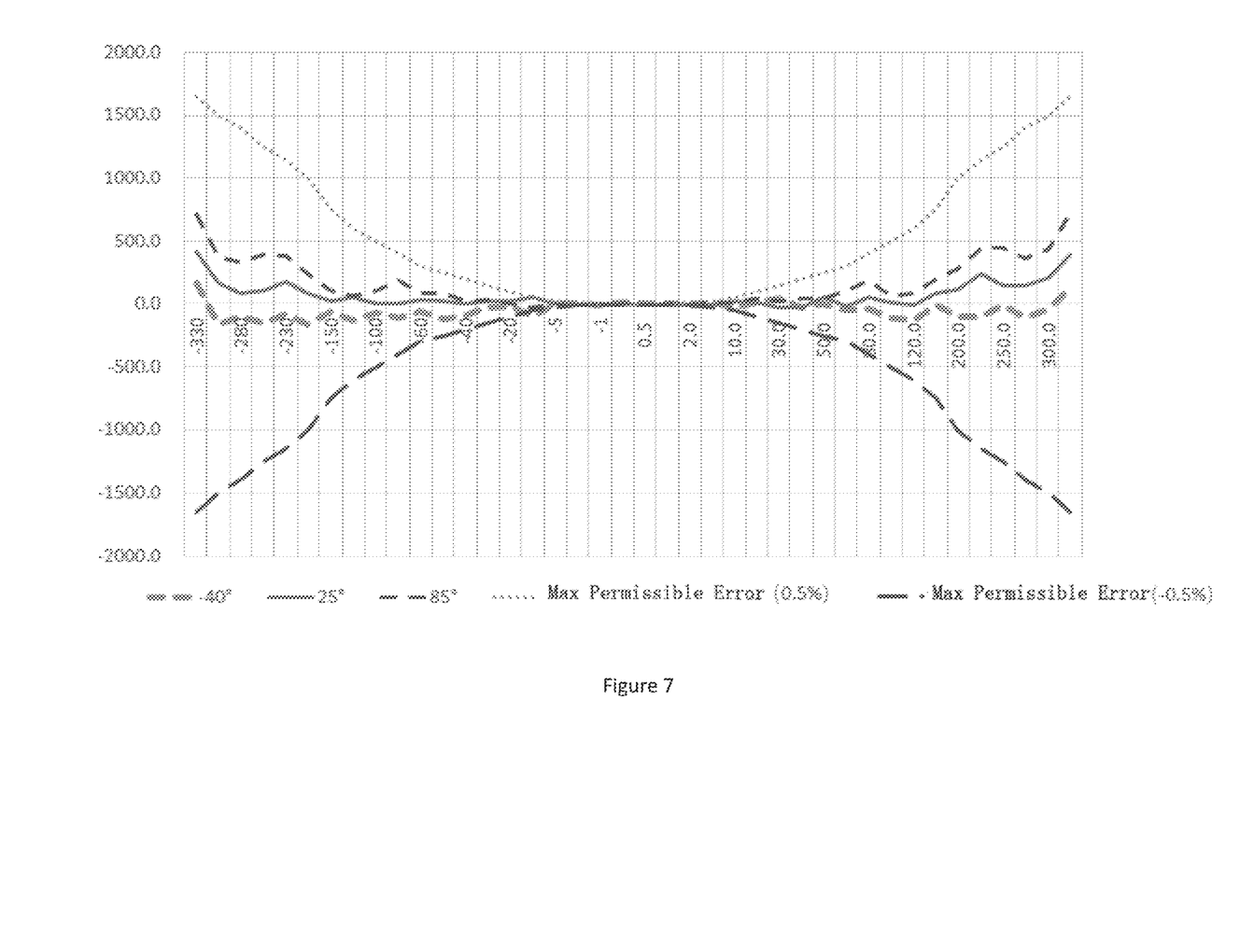
FIG. 7 shows error test results of the fluxgate current sensor of the present invention.

FIG. 7 shows error test results of the fluxgate current sensor developed according to technical solutions of the present invention, wherein currents measured has a range: $-500 \text{ A} \leq I_d \leq +500$ A, temperatures measured range from $-40°$ to $85°$, errors refer to relative errors, expressed in percentage, and maximum permissible errors are $\pm$ and test results show that full temperature range and full measurement range meet requirements, and errors basically fall within 0.2%.

Figure 8:
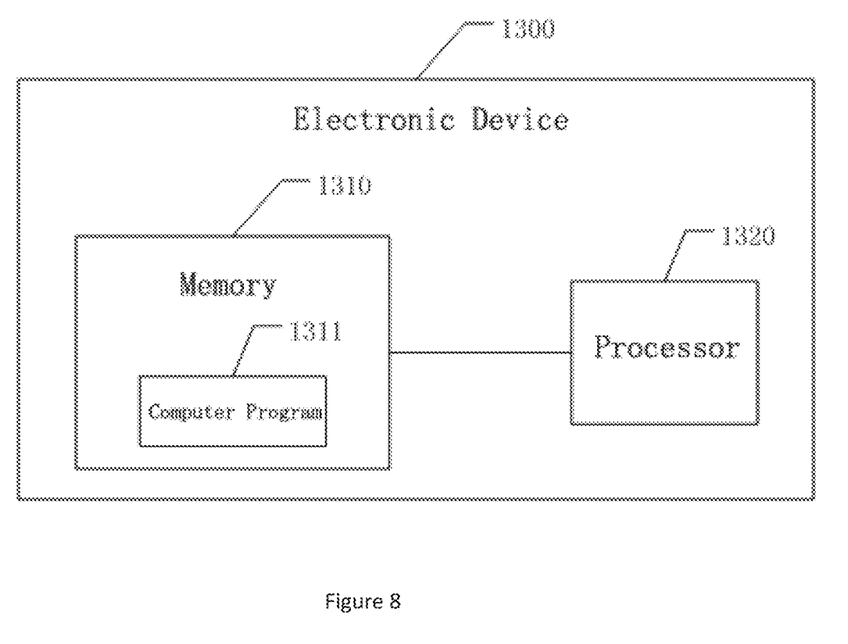
FIG. 8 is a schematic diagram of a hardware structure of a possible electronic device provided by the present invention.
Figure 9:
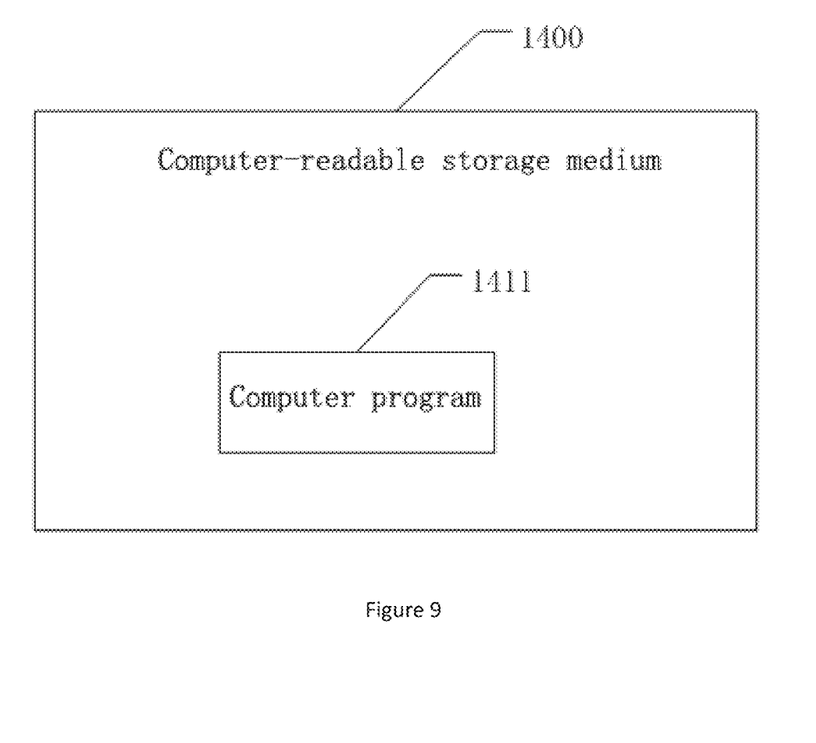
FIG. 9 is a schematic diagram of a hardware structure of a possible computer-readable storage medium provided by the present invention.

Please refer to FIG. 8 which is a schematic diagram of a hardware structure of an electronic device provided by an embodiment of the present invention. As shown in FIG. 8, an embodiment of the present invention provides an electronic device comprising a memory 1310, a processor 1320, and a computer program 1311 stored on the memory 1310 and running on the processor 1320, and the processor 1320 executes the computer program 1311 to implement following steps:

S2—controlling the excitation and detection circuit to output alternating excitation voltages to both ends of the excitation coil, so that alternating excitation currents are excited to flow in the excitation coil and cause the excitation iron core to reach saturation alternately;

S3—conducting difference calculation between currents $i_{e1}$ and $i_{e2}$ flowing through the Re1 and the Re2, i.e., $i_{e1} - i_{e2}$, to obtain current values equivalent to the excitation currents $i_e$;

S4—calculating average values of the excitation currents on the excitation coil, $i_{av}$; and S5—calculating the to-be-measured primary DC currents, $I_d$;

Please refer to FIG. 9 which is a schematic diagram of a computer-readable storage medium provided by an embodiment of the present invention. As shown in FIG. 9, the present embodiment provides a computer-readable storage medium 1400, comprising a computer program 1411 stored thereon, wherein when the computer program 1411 is executed by the processor to realize following steps:

S2—controlling the excitation and detection circuit to output alternating excitation voltages to both ends of the excitation coil, so that alternating excitation currents are excited to flow in the excitation coil and cause the excitation iron core to reach saturation alternately;

S3—conducting difference calculation between currents $i_{e1}$ and $i_{e2}$ flowing through the Re1 and the Re2, i.e., $i_{e1}-i_{e2}$, to obtain current values equivalent to the excitation currents $i_e$;

S4—calculating average values of the excitation currents on the excitation coil, $i_{av}$; and S5—calculating the to-be-measured primary DC currents, $I_d$.

It should be noted that, in the foregoing embodiments, descriptions of each embodiment have their own emphases, and for parts that are not described in detail in a certain embodiment, reference may be made to relevant descriptions of other embodiments.

Those skilled in the art should understand that the embodiments of the present invention may be provided as methods, systems, or computer program products. Accordingly, the present invention can take forms of an entirely hardware embodiment, an entirely software embodiment, or an embodiment combining software and hardware aspects. Furthermore, the present invention may take forms of a computer program product embodied on one or more computer-usable storage media (including but not limited to disk storages, CD-ROM, optical storages, etc.) having computer-usable program code embodied therein.

The present invention is described with reference to flowchart illustrations and/or block diagrams of methods, apparatuses (systems), and computer program products according to embodiments of the present invention. It should be understood that each procedure and/or block in the flowcharts and/or block diagrams, and a combination of procedures and/or blocks in the flowchart and/or block diagram can be realized by computer program instructions. These computer program instructions may be provided to a processor of a general purpose computer, special purpose computer, embedded computer, or other programmable data processing device to produce a machine, so that the instructions executed by the processor of the computer or other programmable data processing equipment are used to realize functions specified in one or more processes of the flowchart and/or one or more blocks of the block diagram device.

These computer program instructions may also be stored in a computer-readable memory capable of directing a computer or other programmable data-processing device to work in a particular manner, so that instructions stored in the computer-readable memory to produce a manufacturing product including an instruction device that implements the functions specified in a flow chart or flow chart and/or a box or boxes of a block diagram.

These computer program instructions may also be loaded onto a computer or other programmable data processing device, causing a series of operational steps to be performed on the computer or other programmable device to produce a computer-implemented processing, so that instructions executed on a computer or other programmable device provide steps to implement functions specified in a process or processes in a flowchart and/or a box or boxes in a block diagram.

While preferred embodiments of the present invention have been described, additional changes and modifications can be made to these embodiments by those skilled in the art once basic inventive concepts of the present invention are understood. Therefore, it is intended that appended claims be construed to cover the preferred embodiment as well as all changes and modifications which fall within protection scope of the present invention.

Obviously, those skilled in the art can make various changes and modifications to the present invention without departing from spirit and scope of the present invention. Thus, provided that these modifications and variations of the present invention fall within the scope of the claims of the present invention and their equivalents, the present invention is also intended to include such modifications and variations.

The invention claimed is:

1. A fluxgate current sensor, comprising a magnetic probe and an excitation and detection circuit, wherein the magnetic probe comprises an excitation iron core and an excitation coil, the excitation coil is connected to the excitation and detection circuit;

the excitation and detection circuit is used to output alternating excitation voltages $v_e$ to the excitation coil, and the excitation coil is excited to generate alternating excitation currents $i_e$ and cause the excitation iron core to reach saturation alternately; and the excitation and detection circuit is further configured to convert the excitation currents $i_e$ flowing through the excitation coil into equivalent differences of two currents, $i_{e1}$ and $i_{e2}$ so as to calculate average values of the excitation currents flowing through the excitation coil via differential equivalent currents $i_{e1}-i_{e2}$, thereby calculating to-be-measured primary currents $I_d$ by the average values of the excitation currents, and the differential equivalent currents $i_{e1}-i_{e2}$ are configured to eliminate zero drift of the fluxgate current sensor, wherein the excitation and detection circuit comprises a DC voltage source Vdc, an H-bridge circuit and differential measuring resistors, and the differential measuring resistors comprise a Re1 and a Re2, wherein the DC voltage source Vdc supplies power for the H-bridge circuit, the H-bridge circuit comprises four switching devices, the switching devices include MOS tubes, and inside the MOS tubes are provided freewheeling diodes, and wherein an upper bridge arm of the H-bridge circuit comprises PNP-type MOS tubes, Q1 and Q2, an lower bridge arm of the H-bridge comprises NPN-type MOS tubes Q3 and Q4, an output terminal of the Q4 in the lower bridge arm is connected to a positive end of the differential measuring resistor Re1, an output terminal of the Q3 in the lower bridge arm is connected to a positive end of the Re2, and negative ends of both the Re1 and the Re2 are connected to a potential reference point of the fluxgate current sensor.

2. The fluxgate current sensor according to claim 1, wherein the excitation iron core comprises an annular closed and saturable soft magnetic core of high magnetic permeability, the excitation iron core is used to carry magnetic flux generated by the to-be-measured primary currents $I_d$ and magnetic flux generated by the excitation currents flowing through the excitation coil, the excitation coil is wound on the excitation iron core, and the excitation coil is used to carry the alternating excitation voltages and the alternating excitation currents constructed by the excitation and detection circuit.

3. The fluxgate current sensor according to claim 1, wherein the alternating excitation voltages $v_e$ are output from the excitation and detection circuit to the excitation coil, and a construction method of the alternating excitation voltages $v_e$ is as follows:

controlling the four switching devices in the H-bridge circuit to be turned on in pairs alternately, when the switching devices Q1 and Q4 are turned on, the switching devices Q2 and Q3 are turned off, and when the switching devices Q1 and Q4 are turned off, the switching devices Q2 and Q3 are turned on, thereby constructing excitation voltages $v_e$ alternating between positive and negative values at both ends of the excitation coil to excite the excitation coil.

4. The fluxgate current sensor according to claim 1, wherein a method for controlling the four switching devices in the H-bridge circuit to be turned on alternately in pairs is as follows:

through magnetic performance parameters and dimensions of the excitation iron core calculated, a current threshold $I_m$ for fully saturating the excitation iron core is obtained, and the current threshold $I_m$ meets following conditions when the fluxgate current sensor is designed:

$$I_m > |I_d/N_e|,$$

wherein $I_d$ refers to a to-be-measured primary current, and $N_e$ refers to number of turns of the excitation coil Le; and when a positive current value flowing through the Re1 reaches the current threshold $I_m$, the switching devices Q1 and Q4 are turned off, the switching devices Q2 and Q3 are turned on, and when a positive current value flowing through the Re2 reaches the current threshold $I_m$, the switching devices Q2 and Q3 are turned off, and the switching devices Q1 and Q4 are turned on, so as to alternately control the four switching devices in the H-bridge circuit to be turned on in pairs alternatively through a peak value of the positive currents flowing through the Re1 and the Re2.

5. The fluxgate current sensor according to claim 1 wherein the differential equivalent currents $i_{e1}-i_{e2}$ are constructed as follows:

the four switching devices in the H-bridge circuit are turned on in pairs alternatively, and when a switching device on the upper bridge arm of the H-bridge circuit and a switching device on the lower bridge arm of the H-bridge circuit are turned on simultaneously, the excitation currents $i_e$ flowing through the excitation coil flow through the Re1 and the Re2 to form current loops; and when the switching devices Q1 and Q4 are turned on, the excitation currents $i_e$ flow through the Re1, and at this time, the excitation currents $i_e$ are defined to flow in a same direction as a current direction in the Re1, and when the switching devices Q2 and Q3 are turned on, the excitation currents $i_e$ are defined to flow in an opposite direction to a current direction in the Re2, so the excitation currents $i_e$ is equal to the differential equivalent currents $i_{e1}-i_{e2}$, i.e., $i_e=i_{e1}-i_{e2}$.

6. The fluxgate current sensor according to claim 1 further comprising an operational amplifier, an ADC analog-to-digital converter, and a microprocessor MCU, wherein in a process of obtaining the average values of the excitation currents $i_{av}$ through the differential equivalent current $i_{e1}-i_{e2}$, the operational amplifier makes gain adjustment, so as to output generated digital signals, the ADC analog-to-digital converter is configured for sampling, and microprocessor MCU executes operation.

* * * * *